United States Patent
Skelly et al.

(10) Patent No.: US 7,055,904 B2
(45) Date of Patent: Jun. 6, 2006

(54) VEHICLE SEATING ADAPTED FOR SLEEPING POSTURE

(75) Inventors: Trevor B. Skelly, Winston-Salem, NC (US); Mark Brian Dowty, Rural Hall, NC (US); James Randy Penley, Pfafftown, NC (US); Kurt R. Heidmann, Grand Rapids, MI (US); James R. Yurchenco, Palo Alto, CA (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 10/984,581

(22) Filed: Nov. 9, 2004

(65) Prior Publication Data

US 2005/0140193 A1 Jun. 30, 2005

Related U.S. Application Data

(60) Provisional application No. 60/589,297, filed on Jul. 20, 2004, provisional application No. 60/529,686, filed on Dec. 15, 2003.

(51) Int. Cl.
*B60N 2/62* (2006.01)
(52) U.S. Cl. .............................. 297/284.9; 297/284.11; 297/408
(58) Field of Classification Search ............. 297/284.3, 297/284.9, 284.11, 312, 404, 405, 408
See application file for complete search history.

(56) References Cited

U.S. PATENT DOCUMENTS

| | | | | |
|---|---|---|---|---|
| 660,694 | A | * 10/1900 | Waterbury | 297/404 |
| 866,753 | A | * 9/1907 | Weber | 297/394 |
| 1,008,456 | A | * 11/1911 | Etter | 297/405 |
| 3,550,953 | A | * 12/1970 | Neale | 297/284.11 |
| 3,552,797 | A | * 1/1971 | D'Houdain | 297/408 |
| 3,773,382 | A | * 11/1973 | Coursault et al. | 297/284.9 |
| 3,833,257 | A | 9/1974 | Dove | |
| 4,018,166 | A | 4/1977 | Gutridge et al. | |
| 4,541,669 | A | * 9/1985 | Goldner | 297/284.11 |
| 4,756,034 | A | 7/1988 | Stewart | |
| 4,966,413 | A | * 10/1990 | Palarski | 297/284.6 |
| 5,507,555 | A | 4/1996 | Kiguchi | |
| 5,560,681 | A | 10/1996 | Dixon et al. | |
| 5,857,745 | A | 1/1999 | Matsumiya | |
| 5,954,401 | A | 9/1999 | Koch et al. | |
| 5,992,798 | A | 11/1999 | Ferry | |
| 6,059,364 | A | 5/2000 | Dryburgh et al. | |
| 6,119,980 | A | 9/2000 | Ferry | |
| 6,276,635 | B1 | 8/2001 | Ferry et al. | |
| 6,305,644 | B1 | 10/2001 | Beroth | |

(Continued)

FOREIGN PATENT DOCUMENTS

| EP | 0869061 A3 | 11/1999 |
|---|---|---|
| EP | 1043225 A2 | 10/2000 |

(Continued)

*Primary Examiner*—Peter R. Brown
(74) *Attorney, Agent, or Firm*—Adams Evans P.A.

(57) ABSTRACT

A passenger seat for a vehicle includes a seat back; and a seat bottom, which may be mounted to a fixed backshell. The seat bottom is selectively configurable such that at least a portion of one side thereof is higher than at least a portion of the opposite side thereof, relative to a floor of said vehicle, so as to support a passenger who is seated on said seat bottom in a rotated position wherein one of said passenger's hips is higher than the other hip relative to said floor.

15 Claims, 15 Drawing Sheets

U.S. PATENT DOCUMENTS

| | | |
|---|---|---|
| 6,412,870 B1 | 7/2002 | Higgins et al. |
| 6,494,536 B1 | 12/2002 | Plant |
| 6,692,069 B1 | 2/2004 | Beroth et al. |
| 6,769,739 B1 | 8/2004 | Salzer et al. |
| 2003/0075962 A1 | 4/2003 | Saltzer et al. |
| 2003/0085597 A1 | 5/2003 | Ludeke et al. |
| 2004/0195882 A1* | 10/2004 | White .................... 297/284.3 |
| 2005/0029846 A1* | 2/2005 | Jonas .................... 297/284.3 |

FOREIGN PATENT DOCUMENTS

| | | |
|---|---|---|
| EP | 1044878 A2 | 10/2000 |
| EP | 1097864 A1 | 5/2001 |
| GB | 2295962 A | 6/1996 |
| GB | 2331237 A | 5/1999 |
| JP | 3-1837 | 1/1991 |
| WO | WO 01/32506 A1 | 10/2000 |

\* cited by examiner

VEHICLE SEATING ADAPTED FOR SLEEPING POSTURE

CROSS-REFERENCE TO RELATED APPLICATIONS

This application claims the benefit of U.S. Provisional Application No. 60/529,686 filed Dec. 15, 2003, and Provisional Application No. 60/589,297, filed Jul. 20, 2004.

BACKGROUND OF THE INVENTION

This invention relates generally to seating and more particularly to a tourist/coach class aircraft seating arrangement. Aircraft seating is typically divided into various classes, for example first class, business class, and coach or tourist class. For each class of seating, an individual passenger is allotted a preselected amount of space (both area and volume). First-class seats provide the most individual space, and also may include features to improve comfort, such as fully reclining sleeper functions. In contrast, the tourist/coach class is provided with a relatively small amount of space, in order to provide the most efficient transportation and lowest cost. For example, the longitudinal space or "pitch" of the seat rows may be as little as 71 cm (28 in.) However, this space limitation in combination with the seat design can create a very ineffective environment for either working (e.g.: on a lap top computer) or sleeping/stretching (lack of comfort). This lack of effectiveness can result in passenger frustration. In addition, passengers sitting in a row directly forward of another passenger can "recline" their seat into the "living space" of the passenger behind, resulting in a lack of harmony between passengers and a phenomenon known as "air rage". The lack of passenger effectiveness and harmony between rows of passengers results in economy class travel being frequently considered as a "bad experience". Modern aircraft are increasingly capable of longer flight segments, thus, the ability to create a more "effective" environment within economy class travel, allowing passengers to adopt multiple postures such as sleep and creating better harmony between passengers during long flights is increasingly important.

One of the primary factors causing angst among passengers is the act of reclining a seat into the living space of another passenger. Another is the natural competition for armrest space resulting from shared armrests. To alleviate the anger generated within a cabin due to the competition for living space, inventors have conceptualized items that modify FAA certified seating to restrict or eliminate the recline of the seat directly in front of them. Passengers also use violence and intimidation, to regain their living space at the expense of the passenger sitting directly in front of them.

To alleviate discomfort, it is advantageous for a passenger to sit or lie in various positions during a flight. Overall, with longer flight segments, passengers find it necessary to adopt an increasing number of postures and undertake an increasing number of activities. Such activities include but are not limited to, sitting upright, reclining, watching a movie, working on a lap top computer, stretching or slouching, sleeping, and "perching". Unfortunately, conventional coach class seats do not readily accommodate positions other than simple sitting in the upright or reclined positions, and the amount of recline is limited by the above-mentioned seat pitch.

Accordingly, it is an object of the invention to provide a passenger seating arrangement in which the passenger may maintain a "side sleeping" position with one hip higher than the other without having to use muscular effort.

It is another object of the invention to provide a passenger seating arrangement which accommodates a passenger's shoulder in a rotated position.

It is another object of the invention to provide a passenger seat which supports a passenger's head in a side sleeping position.

BRIEF SUMMARY OF THE INVENTION

These and other objects are met by the present invention, which in one embodiment provides a passenger seat for a vehicle, including: a seat back and a seat bottom. The seat bottom is selectively configurable such that at least a portion of one side of the seat bottom is higher than at least a portion of the opposite side thereof, relative to a floor of the vehicle. This configurations supports a passenger who is seated on the seat bottom in a rotated position wherein one of the passenger's hips is higher than the other hip relative to the floor.

According to another embodiment of the invention, the seat back and the seat frame are attached to a frame which is adapted to be mounted to a floor of the vehicle.

According to another embodiment of the invention, the seat bottom includes at least one support wing which is selectively moveable to an effectively raised position so as to support the hips of a passenger in the rotated position.

According to another embodiment of the invention, the support wing is disposed at a forward corner of the seat bottom.

According to another embodiment of the invention, the support wing is pivotally connected to the remainder of the seat bottom.

According to another embodiment of the invention, the passenger seat further includes at least one support lever disposed underneath the support wing. The support lever selectively pivotable between a lowered position and a raised position.

According to another embodiment of the invention, at least a portion of the seat back may be selectively rotated about a line generally parallel to the passenger's spine so as to create a recessed niche for accommodating one of the passenger's shoulders.

According to another embodiment of the invention, the passenger seat further includes a headrest disposed at an upper end of the seat back, the headrest has two laterally spaced-apart side portions and is rotatable such that one side portion is lower than the other relative to a floor of the vehicle.

According to another embodiment of the invention, a passenger seat for a vehicle includes: a frame a backshell attached to the frame; a seat back inserted into the backshell; and a seat bottom attached to the frame. The seat bottom is selectively configurable such that at least a portion of one side of the seat bottom is higher than at least a portion of the opposite side thereof, relative to a floor of the vehicle, so as to support a passenger who is seated on the seat bottom in a rotated position wherein one of the passenger's hips is higher than the other relative to the floor.

According to another embodiment of the invention, a passenger seat for a vehicle includes: a fixed backshell; a seat back inserted into the backshell; and a seat bottom positioned to support the weight of a passenger thereon. Means are provided for selectively moving at least a portion of the seat bottom so as to support the hips of a passenger in a rolled position wherein one hip is higher than the other hip relative to a floor of the vehicle.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1A:
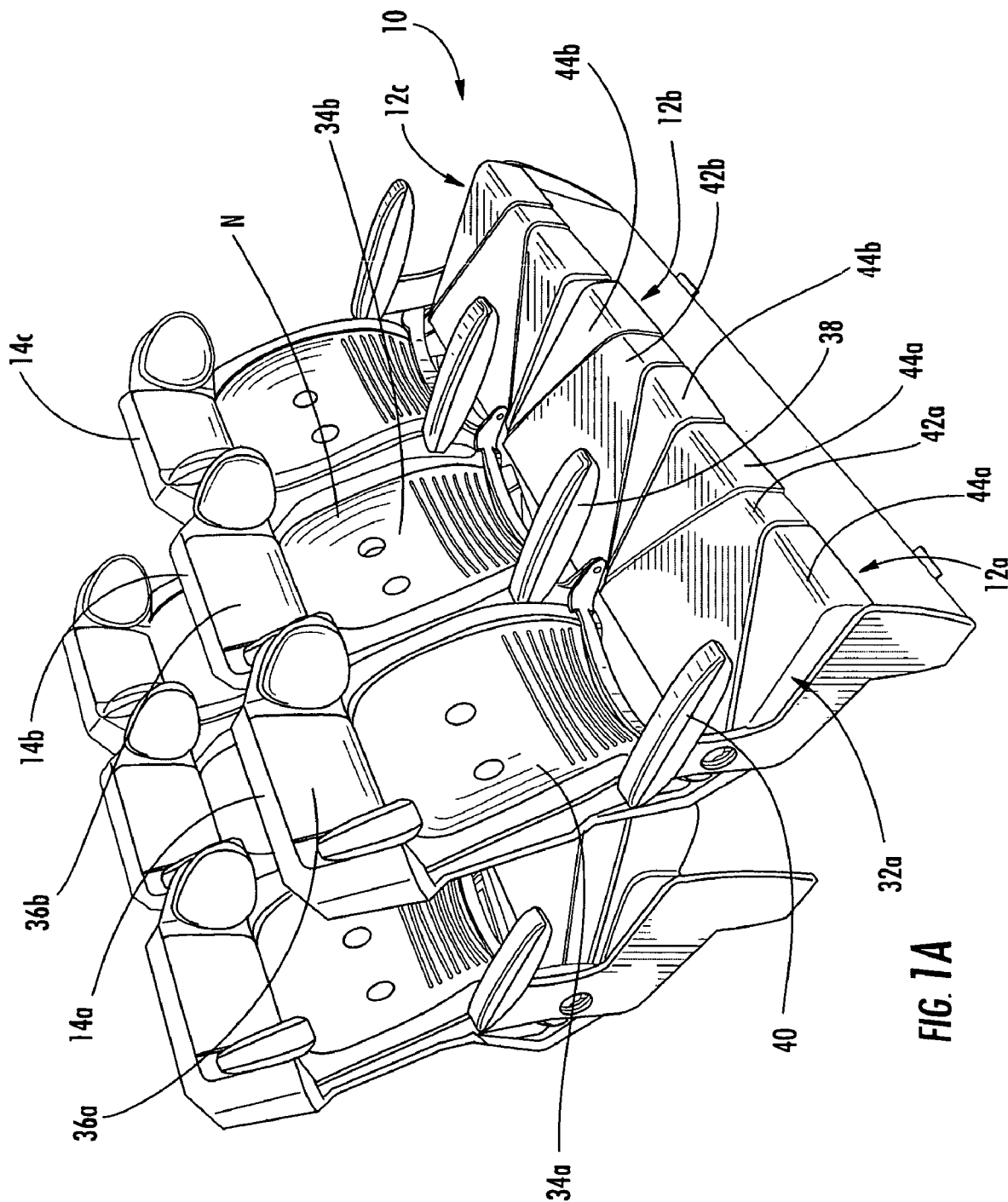
FIG. 1A is a perspective view of a passenger seat set constructed in accordance wit the present invention, disposed in an upright sitting position.

Referring to the drawings wherein identical reference numerals denote the same elements throughout the various views, FIGS. 1A–1E, 2, and 3 illustrate an exemplary passenger seat set 10. In the illustrated example, the seat set 10 includes three seats 12a, 12b, and 12c, which are supported by rigid backshells 14a, 14b, and 14c, respectively, each of which includes a stationary video screen 13 and a folding tray table 15. In contrast to prior art seats, the backshells 14a, 14b, and 14c are contoured with sculpted clearance areas 16 and 17 to provide room for the knees of an aft-seated passenger. The seats 12 could alternatively be arranged as single units or in side-by-side units of any number of adjacent seats. The backshells 14a, 14b, and 14c are attached to and supported by a transverse main beam 18 in a cantilevered fashion. The main beam 18 is attached to leg units 20 and 22 that are in turn mounted to the floor of the vehicle. The main beam 18 is depicted here as an "I" section member, but the shape is not critical and may be varied. For example, a hollow cross-section (not shown) may be used. Each leg unit 20 and 22 includes a longitudinal bottom member 24, a vertical upright member 26, and a longitudinal top member 28, which may all be part of a single unitary component. The leg units 20 and 22 may be tied together by a transverse front beam 30, which may be a hollow box-section member suitable for containing electronics or other seat-related equipment (not shown). The main beam 18 and the leg units 20 and 22 cooperatively define a seat frame.

The seats 12a, 12b, and 12c are substantially identical to each other, accordingly any part of the following description specifically referring to one of the seats 12a, 12b, or 12c, or to the components thereof, may be taken to apply to the other seats as well. The seat 12a includes a seat bottom 32a, a seat back 34a, and a headrest 36a. Armrests 38 and 40 are positioned on opposite sides of the seat 12a. One or more of the armrests 38 and 40 may be shared with the adjacent seat 12b in the seat set 10. The armrests 38 and 40 are moved forward from the backshell 14a so that no gap is required between adjacent backshells 14. This helps create the space needed to accommodate the living-space protected postures described below. The seat bottom 32a includes a central portion 42a and at least one support wing 44a. In the illustrated example, a pair of support wings 44a and 44a' are pivotally attached to the central portion 42a at angled hinge lines.

The seat 12a allows a passenger seated therein to reconfigure the seat 12a to achieve a number of different sitting postures while ensuring that the living space of the individual passengers are mutually protected from each other. In each of these configurations, no part of the seat 12a extends beyond the backshell 14a or the backshell of the seat which is positioned directly in front of the seat 12a. In contrast to prior art seats, these protected living space postures are possible even though the seat rows are mounted with a very small longitudinal spacing or pitch, denoted "P". The pitch P is set according to the wishes of the individual aircraft operator. In the illustrated example, the pitch P will be in the accepted range for "coach class" seats which have not heretofore had the capability of providing multiple postures with fixed living space. This range for the pitch "P" is about 79 cm (31 in.) to about 92 cm (36 in.), and more typically about 81 cm (32 in.) to about 86 cm (34 in.) The seats 12 may also be spaced at an even smaller pitch by limiting their motion somewhat, for example about 71 cm (28 in.) For comparison, it is noted that the accepted pitch between prior art business-class seats is substantially larger, for example about 140 cm (55 in.) or greater. The seat 12a may be reconfigured by various means. For example, the moving components of the seat 12a may be connected to actuators which operate in response to commands from individual switches or a control unit. Alternatively, individual manual controls may be provided for the various seat components.

FIG. 1A shows the seat 12a configured for a regular sitting posture. In this configuration, the seat bottom 32a is at its most rearward location, the seat back 34a is at its most upright position against the backshell 14a, and the headrest 36a is in a raised position. The passenger is comfortably supported in the regular sitting posture by the cushioning of the headrest 36a and the seat bottom 32a, and the flexing action of the seat back 34a, described in more detail below. The seat bottom 32a may be equipped with a "waterfall" feature, described in more detail below, which allows the effective front-to-rear length of the seat bottom 32a to be selectively reduced for increased passenger comfort. Because the backshell 14a of the passenger's seat 12a and those of all the surrounding seats are rigid and do not move, the passenger's individual allotted space is protected from intrusion of the other passengers.

Figure 1B:
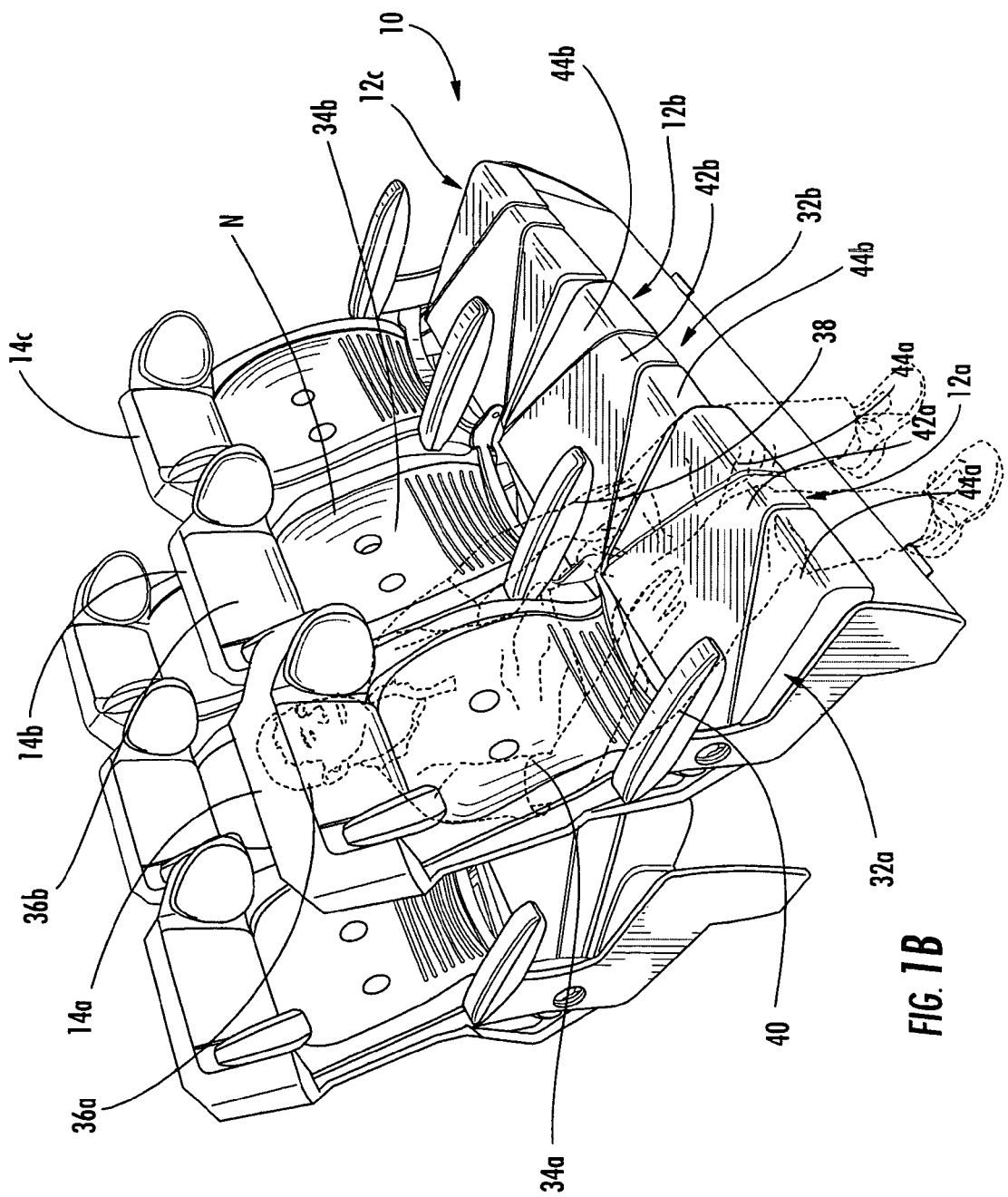
FIG. 1B is a perspective view of the passenger seat set of FIG. 1, with one of seats disposed in a reclined position.

FIG. 1B shows the seat 12a configured for a "reclined" posture. The seat bottom 32a is translated forward relative to the backshell 14a. The clearance areas 16 and 17 of the backshell 14a and the forward-positioned armrests of the seat positioned ahead of seat 12a accommodate the passenger's knees and thus allow the passenger in the seat 12a to move farther forward than would otherwise be possible. The bottom end of the seat back 34a is pulled forward along with the seat bottom 32a, and the upper end of the seat back 34a moves down the surface of the backshell 14a, in a manner discussed in more detail below. The seat back 34a thus moves forward while tilting backwards into a reclined position. The head rest 36a may also be lowered, either manually or automatically in unison with the motion of the seat back 34a, so that the head rest 36a maintains a constant relative height compared to the upper end of the seat back 34a. Throughout the recline motion, the seat back 34a is restrained by the backshell 14a and does not move aft, thus it does not intrude into the space of a passenger seated behind seat 12a. This recline position is achieved without the need to lower the passenger's center of gravity. Thus, no special equipment is needed to lift the passenger, unlike prior art designs which lower the passenger's center of gravity, and thus have to generate a "return" force sufficient to lift the weight of the heaviest anticipated passenger, in order to return to the upright position.

Figure 1C:
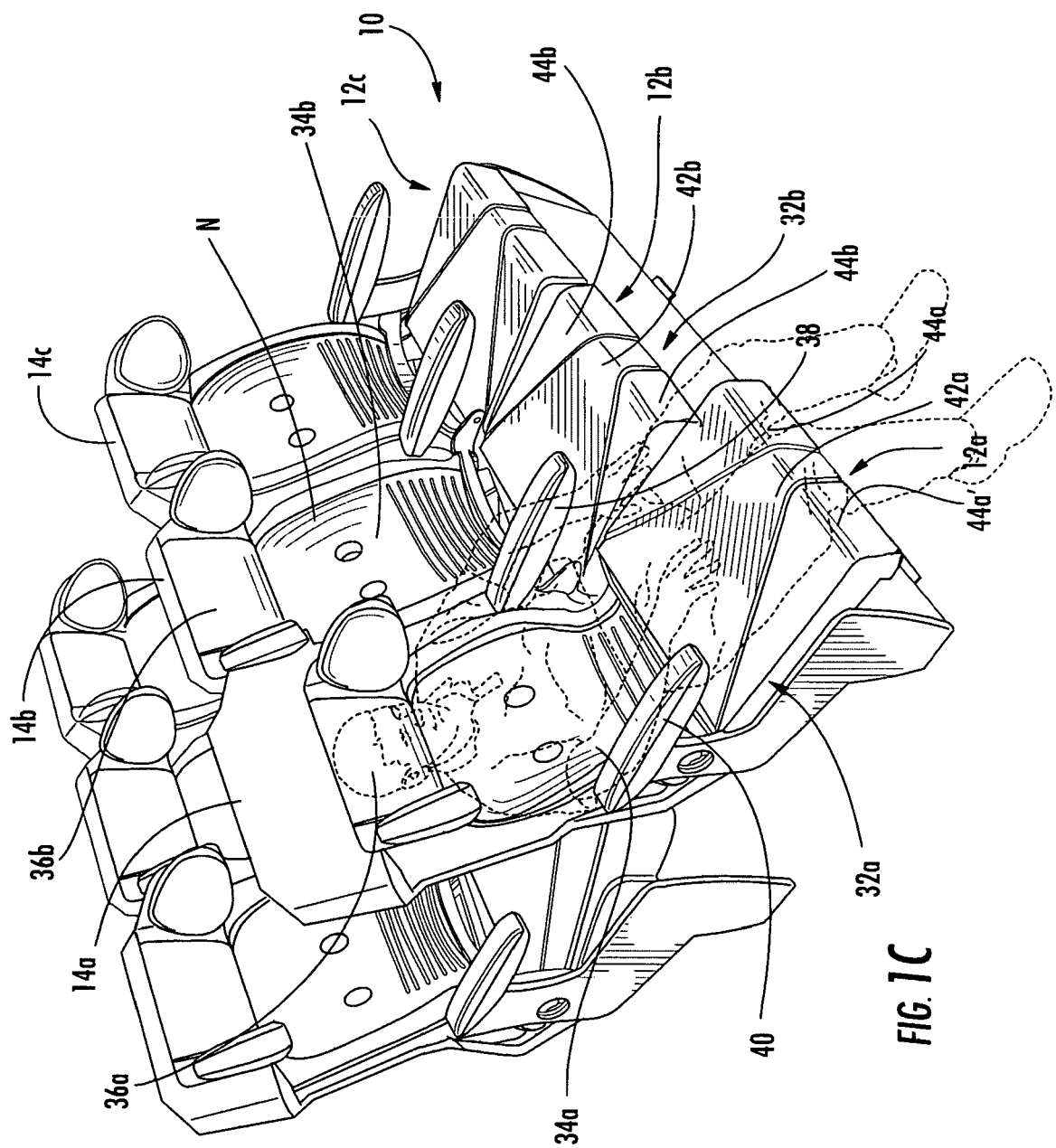
FIG. 1C is a perspective view of the passenger seat set of FIG. 1, with one of seats disposed in a "slouching" position.

FIG. 1C shows the seat 12a configured for a "slouch" or "slump" posture. The seat bottom 32a is translated yet further forward relative to the backshell 14a as compared to the "reclined" position. The bottom end of the seat back 34a is pulled farther forward along with the seat bottom 32a, and the upper end of the seat back 34a moves further down the surface of the backshell 14a. The front edge of the seat bottom 32a is lowered. This configuration allows the passenger to stretch out his or her body and legs, and makes it easier for the passenger to place his or her feet beneath the seat bottom of the seat mounted forward of the seat 12a.

Figure 1D:
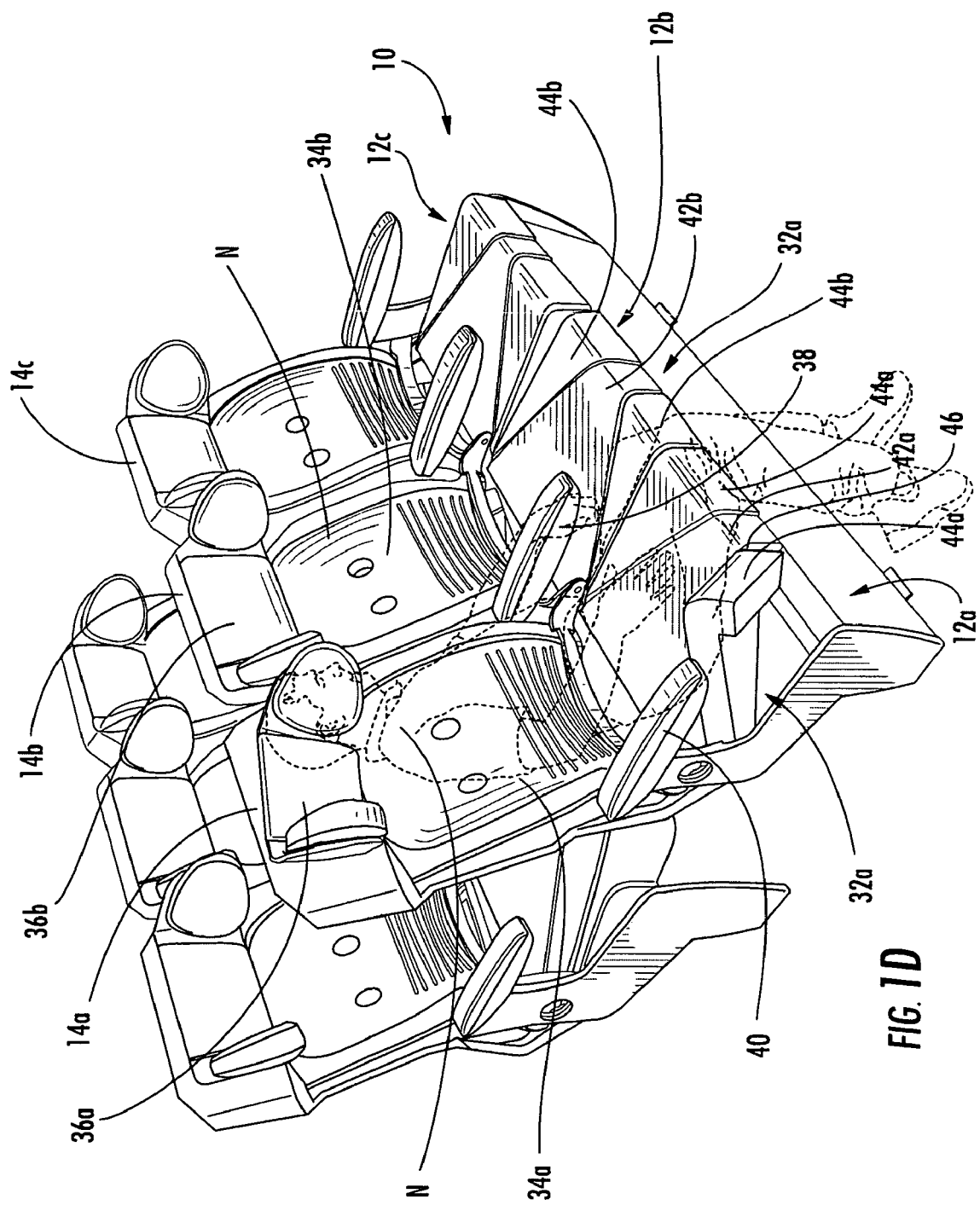
FIG. 1D is a perspective view of the passenger seat set of FIG. 1, with one of seats disposed in a "side sleep" position.

FIG. 1D shows the seat 12a configured for a "side sleep" or "fetal" posture. In this configuration, the seat bottom 32a is translated forward and its front edge is lowered, and the seat back 34a is pivoted back as for the "slouch" posture. The seat back 34a is rotated about a line essentially parallel to the passenger's spine, thus creating a shoulder niche "N". One of the support wings 44a of the seat bottom 32a is pivoted upward along the hinge line 46, depending on the direction the passenger wishes to turn. The head rest 36b about a generally longitudinal axis, causing the side of the head rest 36a towards the direction of the passenger's roll to be lowered towards the shoulder niche N. This position allows the passenger to stretch out vertically, creates a suitable shoulder resting area and head rest, supports the passenger's hips in the rotated position with one hip higher than the other, and prevents the passenger from slipping down off of the seat 12a. The passenger may thus remain in the sleeping position without requiring any muscular activity. It is noted that the support wings 44 need not be hinged. Any structure with allows a portion of the seat bottom 32a to effectively lift upward to support the passenger's in a rotated position may be used. For example, the hinged support wings 44a may be replaced with cushions which can be selectively inflated to create an effectively raised support wing.

Figure 1E:
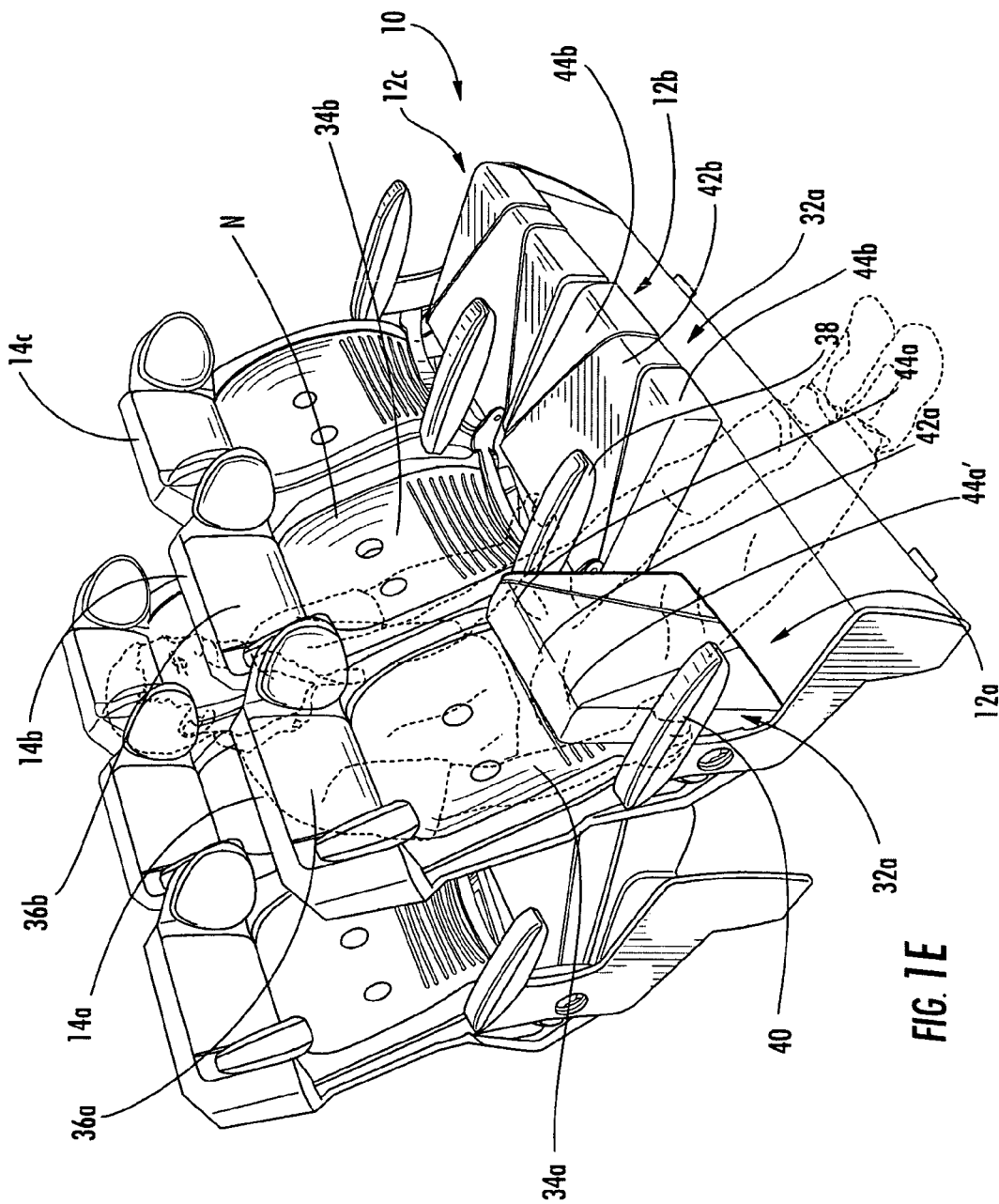
FIG. 1E is a perspective view of the passenger seat set of FIG. 1, with one of seats disposed in a "perch" position.
Figure 2:
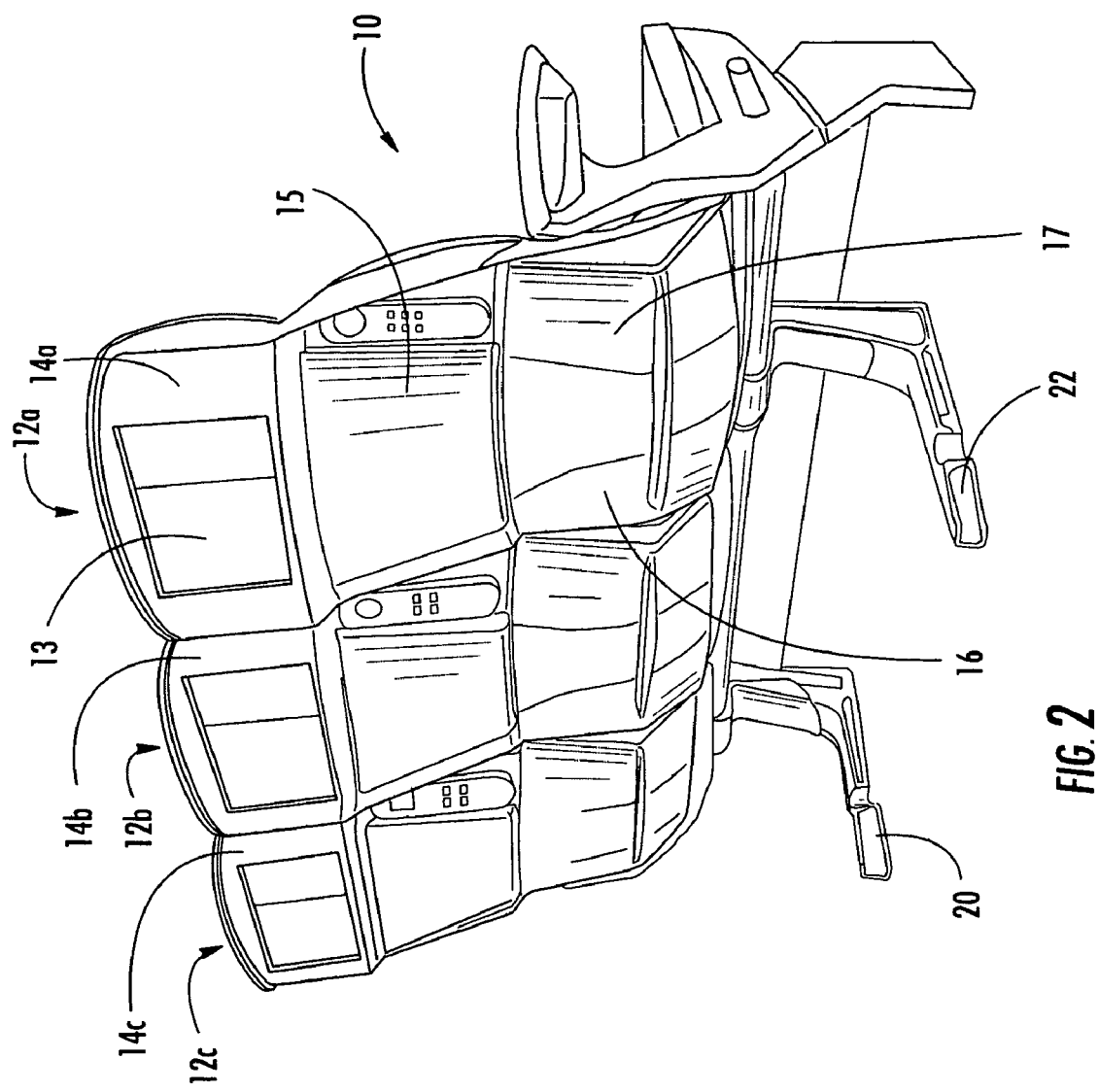
FIG. 2 is rear perspective view of the passenger seat set of FIG. 1.
Figure 3:
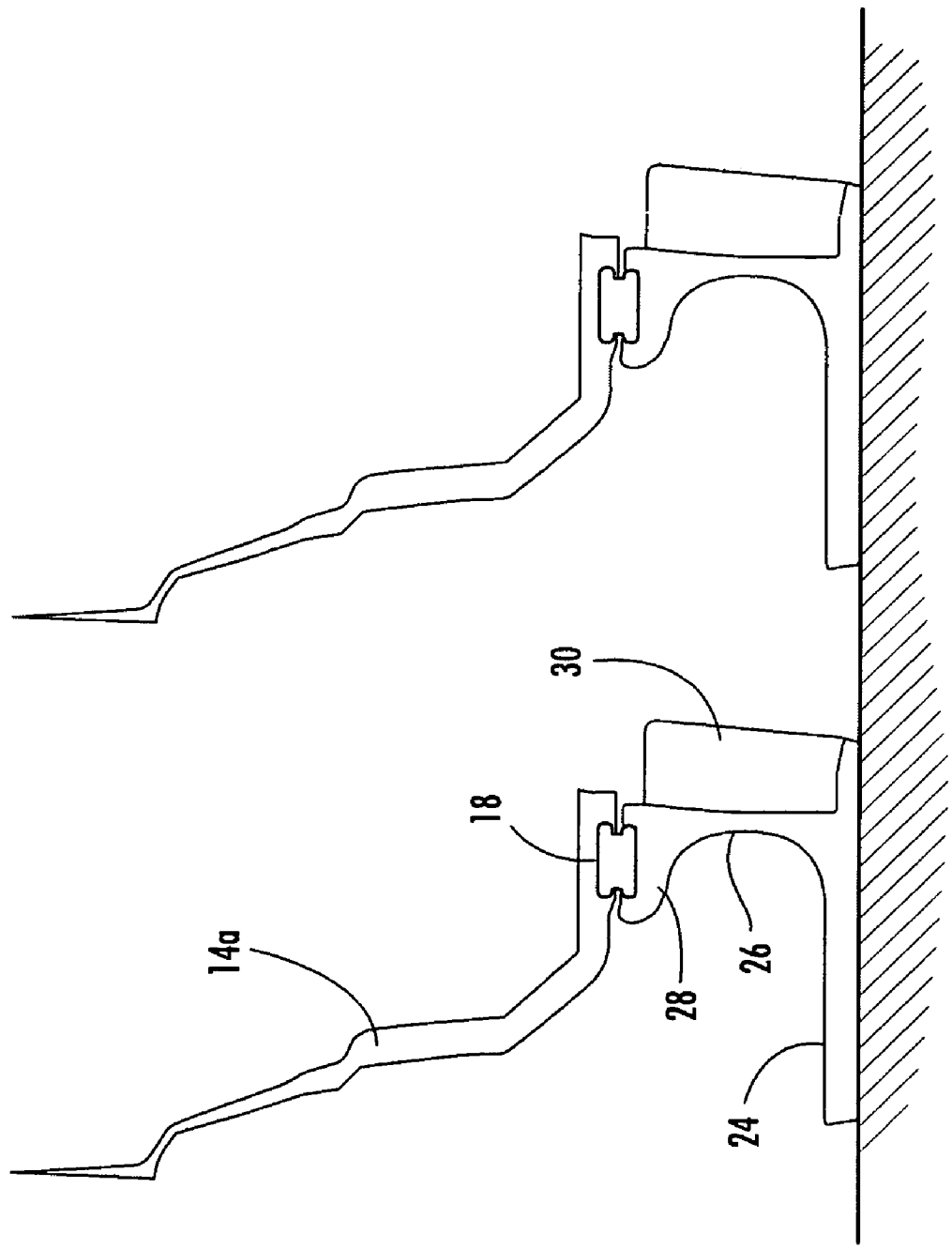
FIG. 3 is a schematic side view of two adjacent seat rows.
Figure 4:
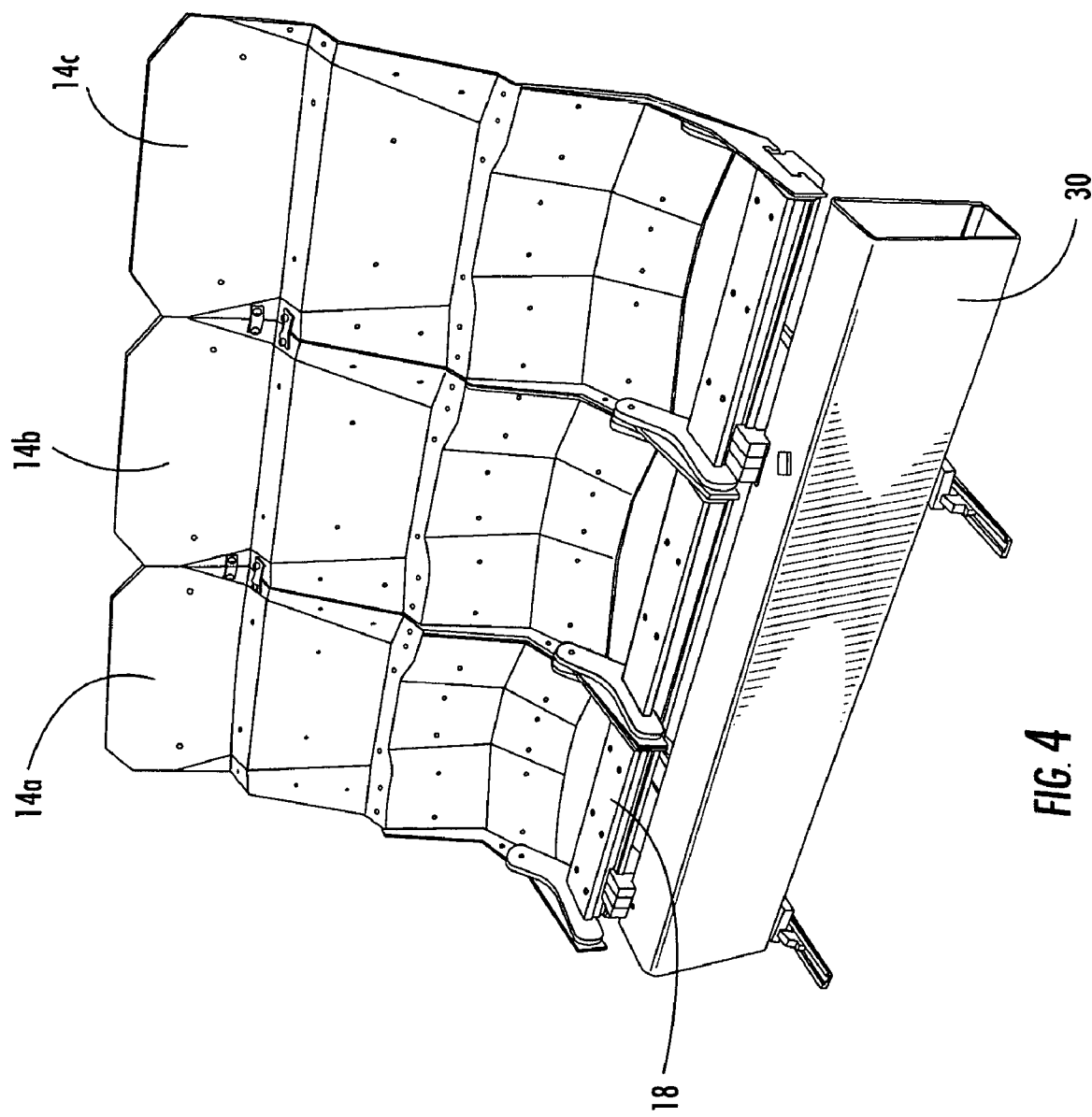
FIG. 4 is a perspective view of a seat frame and attached backshells.

FIG. 1E shows the seat 12a configured for a "perching" posture as follows. The seat bottom 12a is translated backwards and rotated upwards into a raised position. In the raised position the back edge of the seat bottom 32a provides a surface for the passenger to prop against, much the same as sitting on a raised stool. As well as providing an alternative posture, the perch position may be used to facilitate ingress or egress between seat rows by substantially reducing the effective front-to-back length of the seat bottom 32a.

Figure 10:
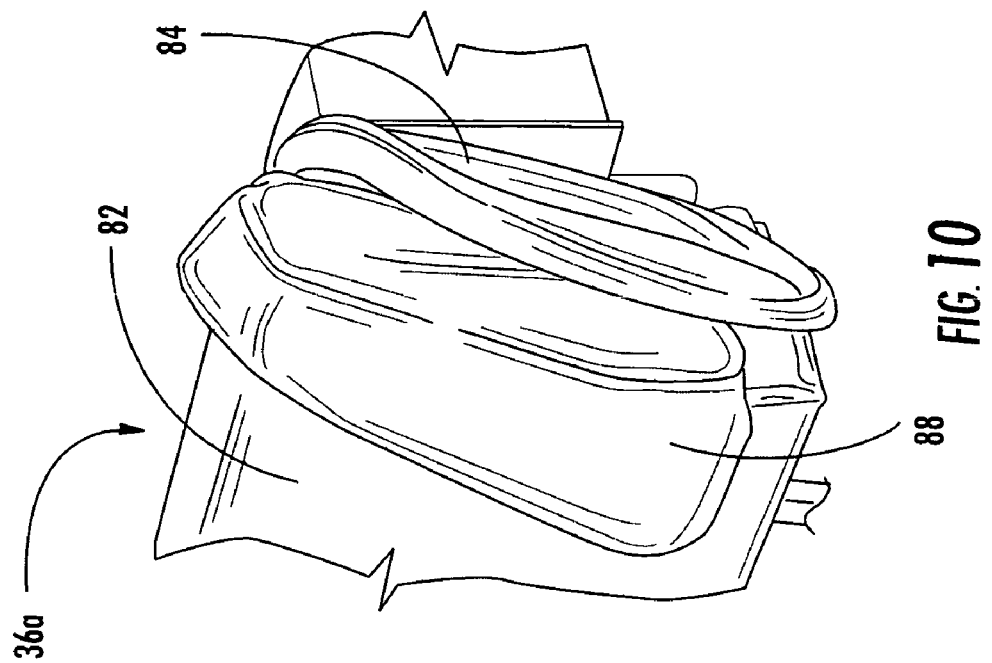
FIG. 10 is another perspective view of a headrest.
Figure 11:
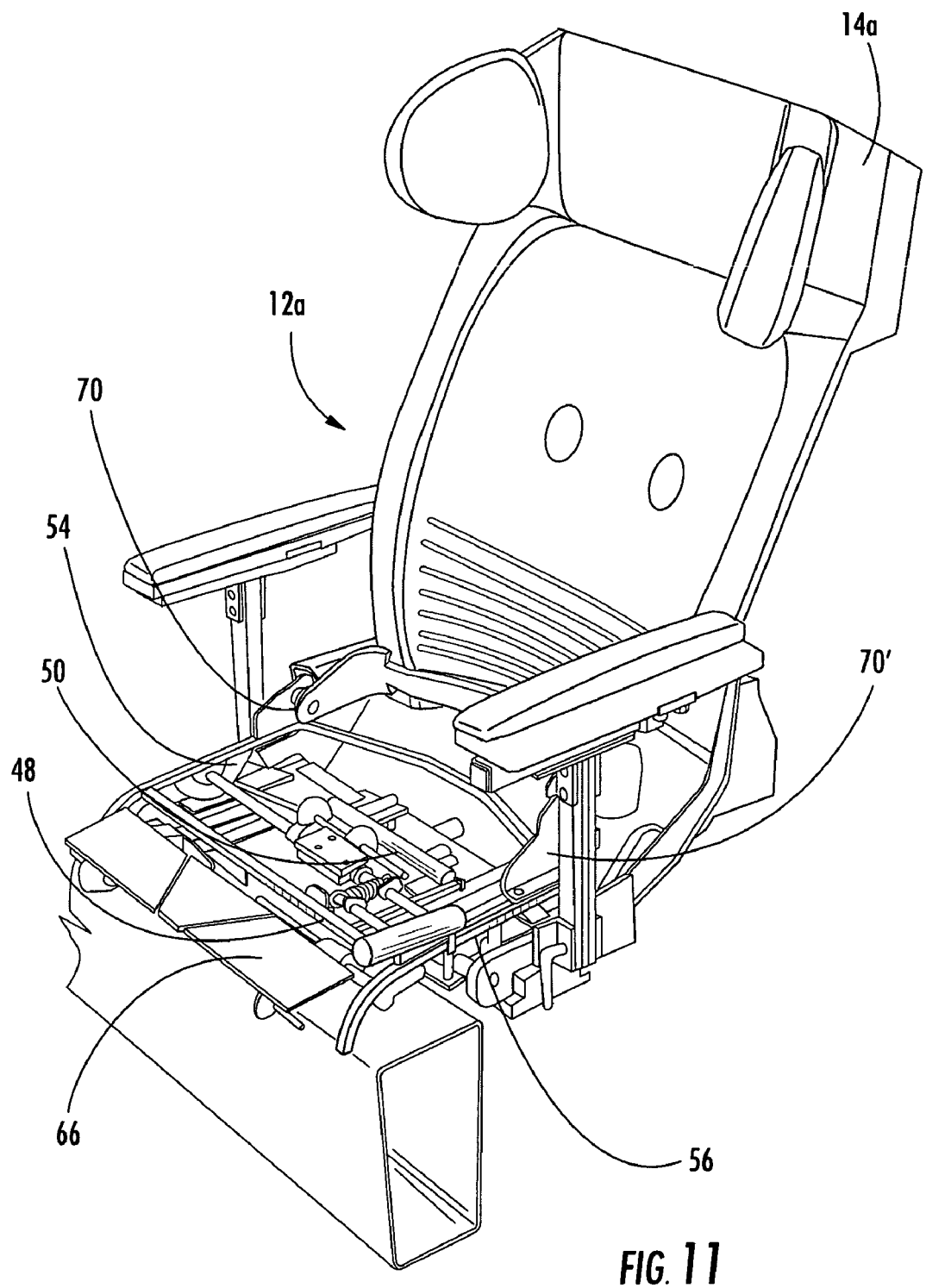
FIG. 11 is a perspective view of a seat.

FIGS. 4–11 illustrate an example of how the internal construction of the seat 12a may be arranged. Referring to FIG. 11, The seat 12a includes a rigid bottom perimeter frame 48 which is connected to the main beam 18 so that it can translate forwards and backwards with respect thereto, for example using slide rail assembly 50. The bottom perimeter frame 48 is covered by a flexible seat pan 52 (removed for clarity in FIG. 11) and a padded bottom cushion (not shown). The bottom perimeter frame 48 is attached to the main beam 18 so that its front end can be selectively raised and lowered to positions above or below horizontal, for example it may be allowed to rock on spaced apart bottom frame pivots 54 and 56.

Figure 6:
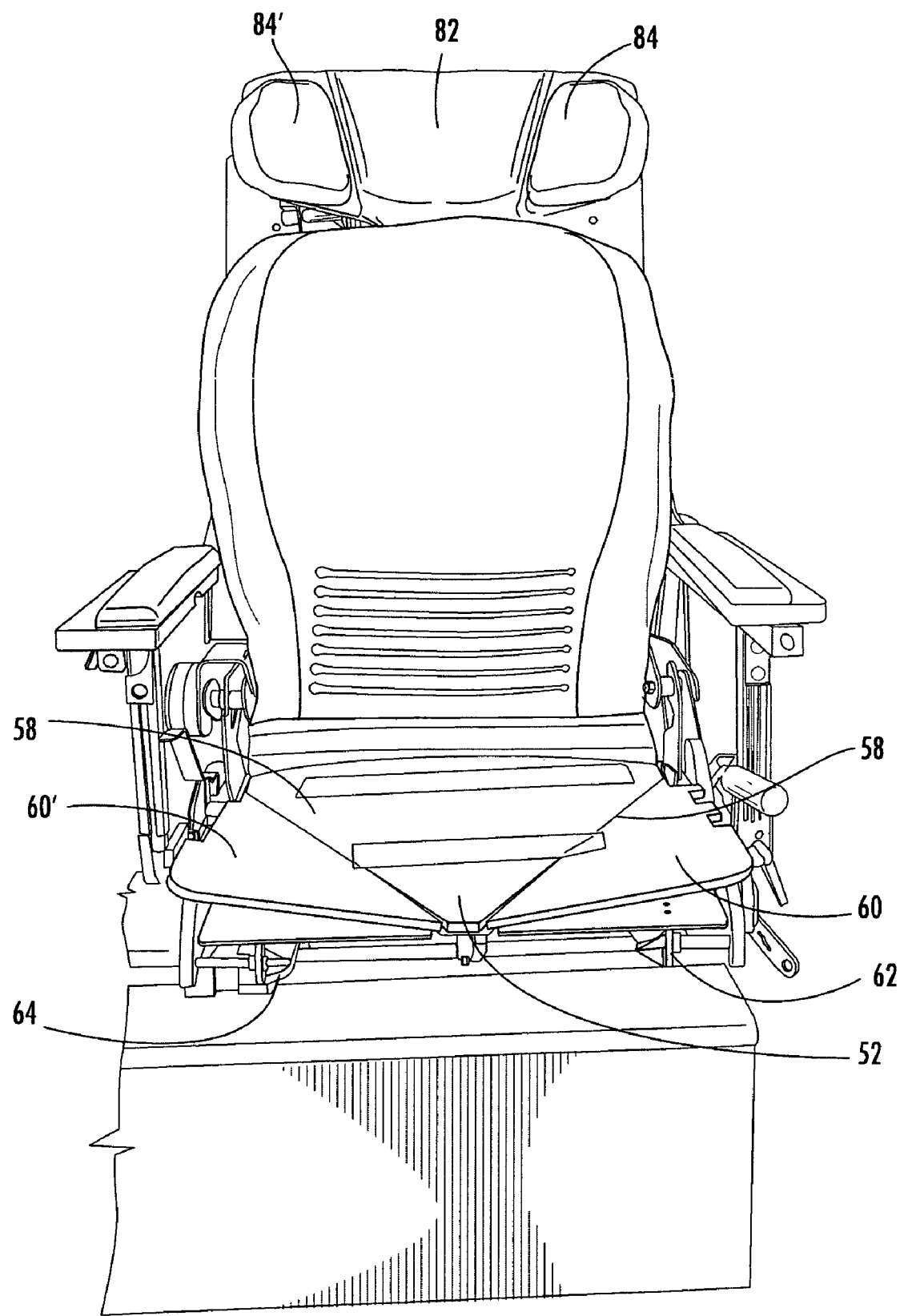
FIG. 6 is front view of a partially disassembled seat, showing the internal construction thereof.
Figure 7:
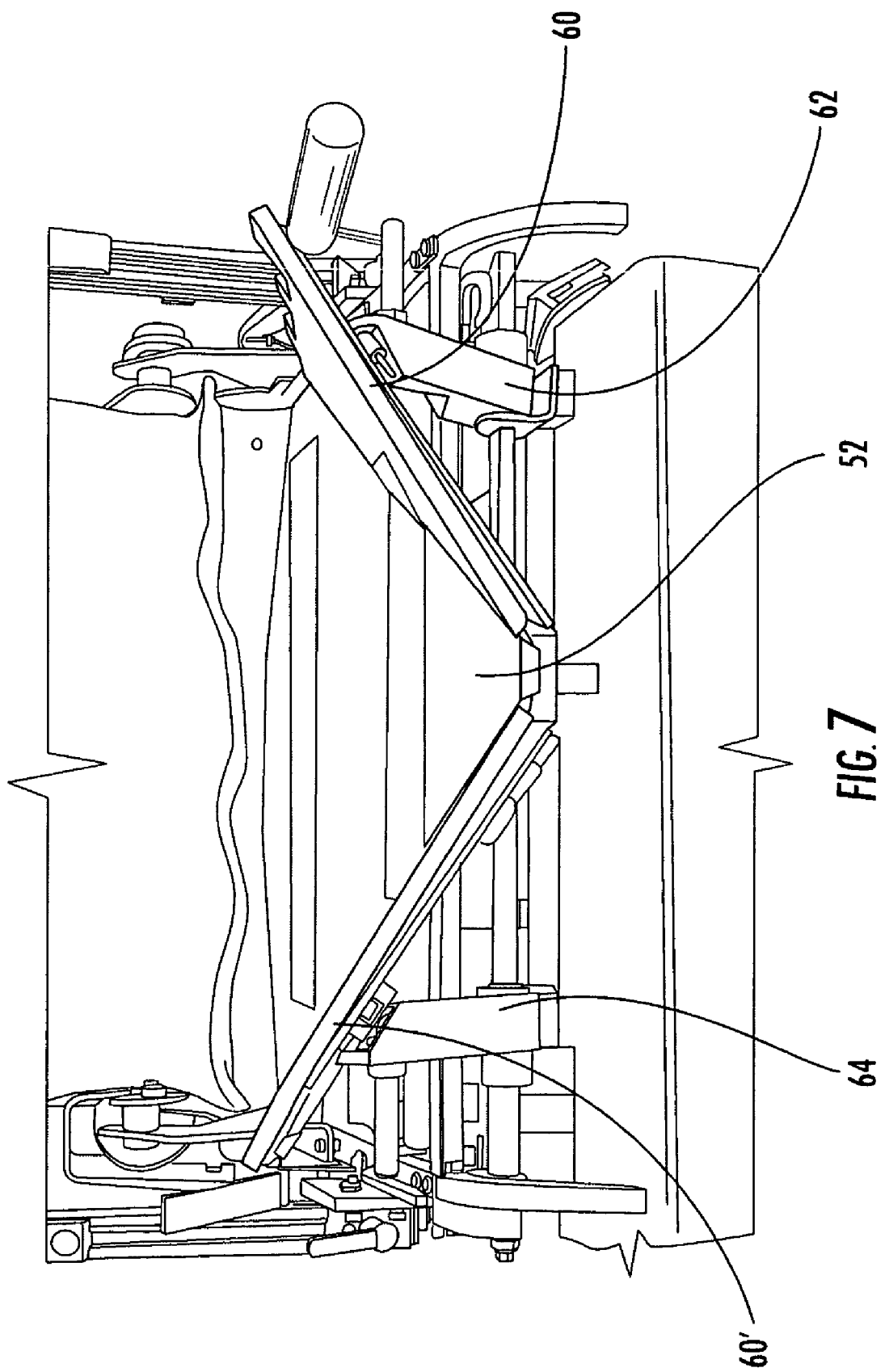
FIG. 7 is front view of a seat bottom having a pivoted support wing.

Referring to FIG. 6, the seat pan 52 includes a pair of angled hinge lines 58 defining a pair of flaps 60 and 60' that form portions of the support wings 44a and 44a'. Each of the flaps 60 and 60' overlies a left or right support lever 62 or 64, respectively. The support levers 62 and 64 can be individually pivoted to either a lowered position or a raised position (see FIG. 7), and there are provisions for maintaining the support levers 62 and 64 in the selected position. In the raised position, the selected flap 60 or 60' is pivoted upward to support the passenger's hip and thigh as described above. The seat bottom 32a may also incorporate a front "waterfall" feature. Specifically, a portion of the front edge of the bottom perimeter frame 48 may be constructed so that it can be selectively folded downwards, thus allowing the seat pan 52 to curl downwards under the passenger's weight and reduce the effective front-to-back length of the seat bottom. In the illustrated example, a hinged lateral support bar 66 (see FIG. 11) is disposed between the support levers 62 and 64 and the front edge of the seat pan 52. Both support levers 62 and 64 may be pivoted downwards simultaneously along with the support bar 66.

A rigid back perimeter frame 68 (see FIG. 5) is connected to the bottom perimeter frame 48 at back pivots 70 and 70'. The upper end of the back perimeter frame 68 includes rollers 72 or other suitable structure which bear against the backshell 14a and allow the back perimeter frame 68 to slide up and down with respect thereto. The reclining motion of the seat back 34a is governed by the interaction of the rollers 72 with the backshell 14a as the bottom end of the seat back 34a is pulled forwards or backwards relative to the backshell 14a by the seat bottom 32a The amount of recline (i.e. change in seat back tilt angle) for a given amount of motion of the seat bottom 32a may be thus be selected by appropriate contouring of the surface of the backshell 14a.

Figure 5:
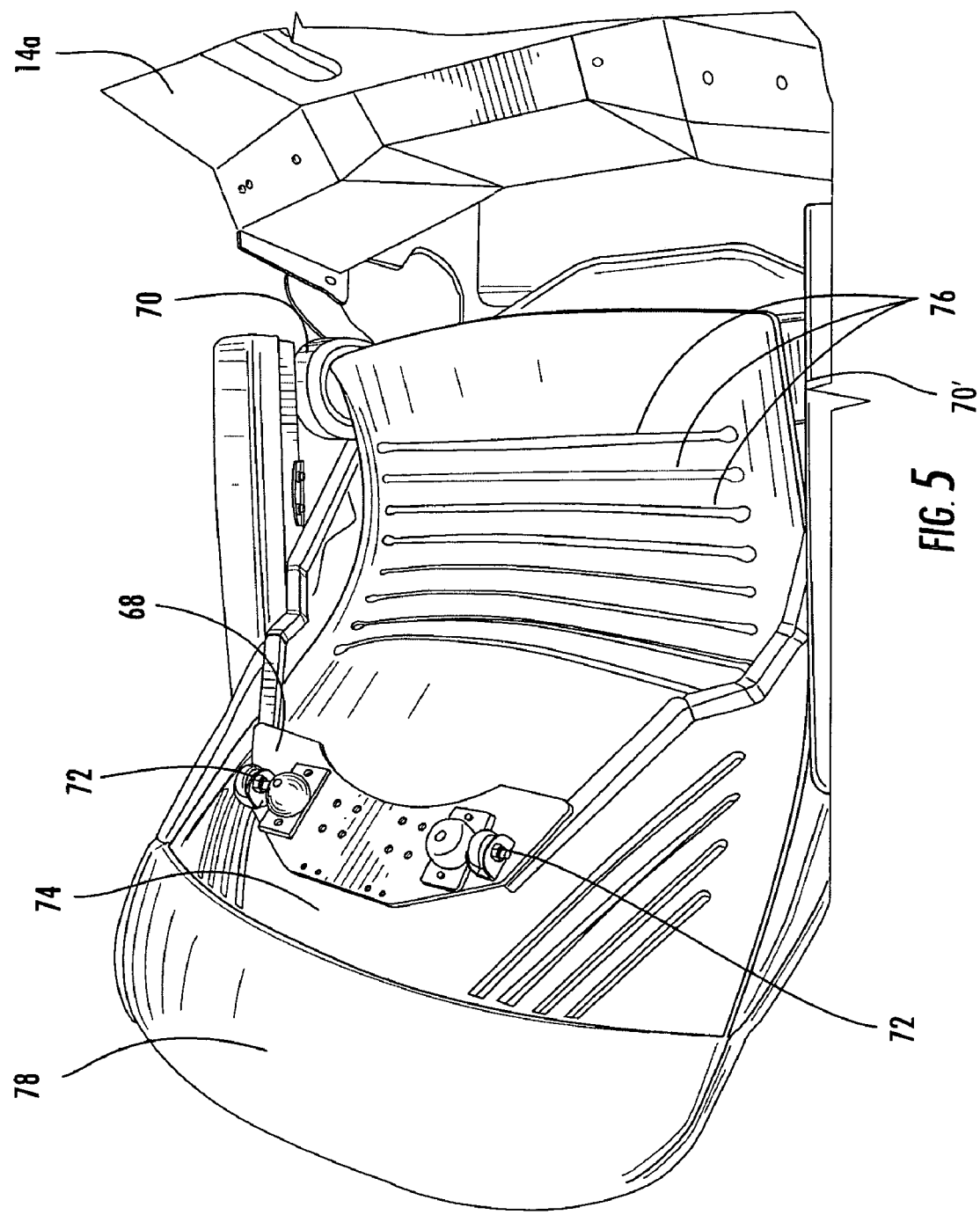
FIG. 5 is a perspective view of a seat back and perimeter frame.

A backrest 74 is attached to the back perimeter frame 68. The backrest 74 is a compound-curved member having a plurality of spaced-apart lateral elements 76. The entire backrest 74 is constructed of an appropriate resilient material such as plastic or synthetic rubber. The lateral elements 76 of the backrest 74 can flex individually to separate positions when a passenger sits in the seat 12a. This provides a relatively constant support to the passenger's spine while allowing for variance in the exact seating position. The backrest 74 may be enclosed by a dress cover 78 as shown in FIG. 5.

Figure 8:
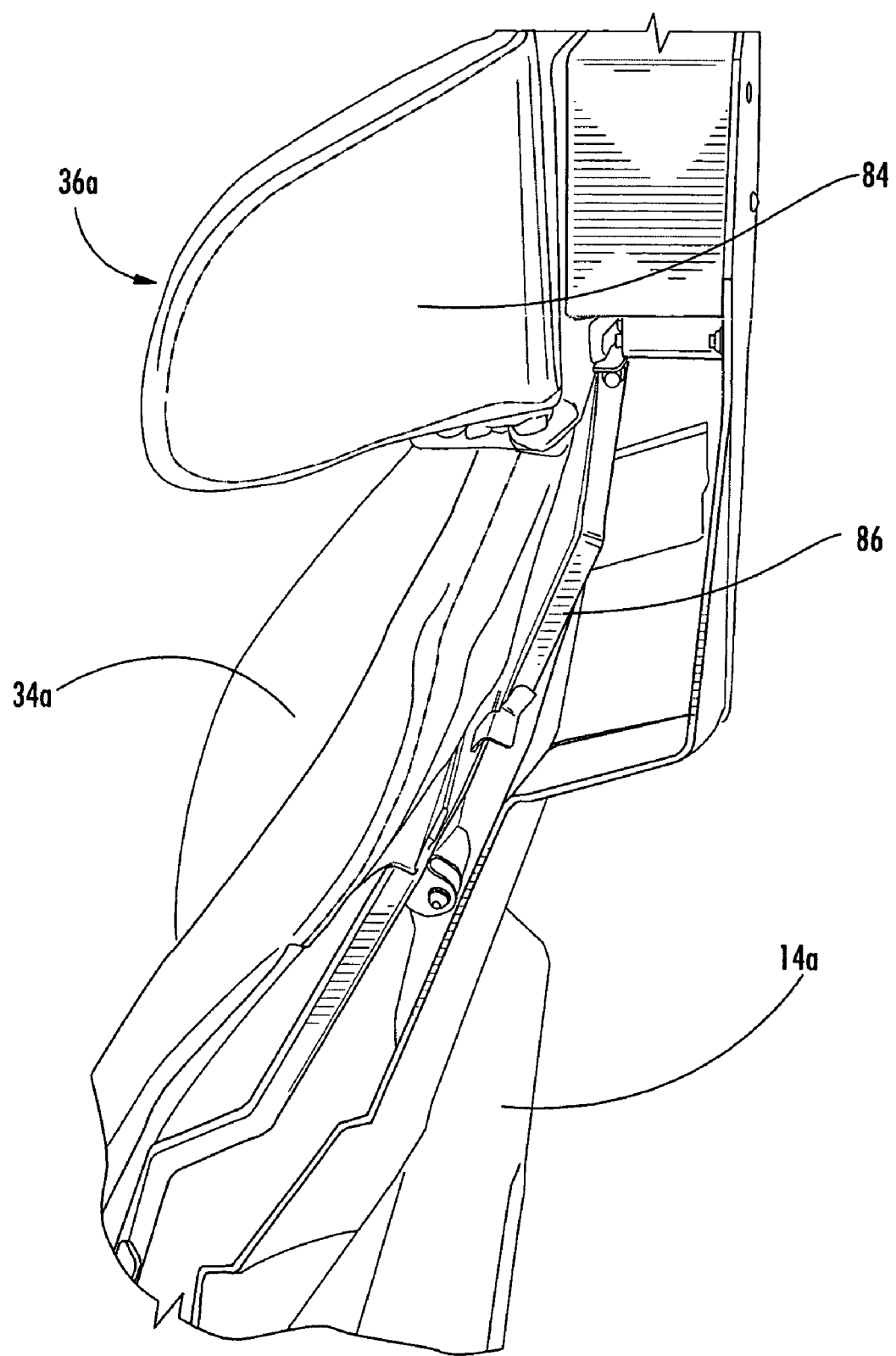
FIG. 8 is a side view of the upper portion of a seat back
Figure 9:
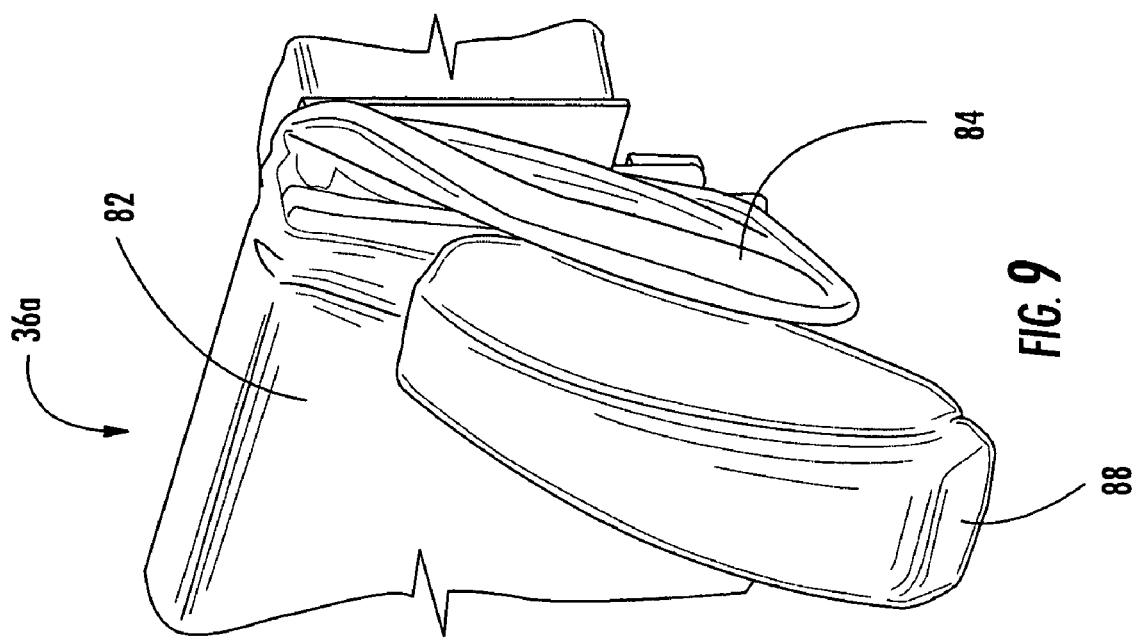
FIG. 9 is a perspective view of a headrest.

Referring to FIGS. 6, 9 and 10, the head rest 36a is attached to the backshell 14a above the seat back 34a. The head rest 36a comprises a center portion 82 and two forward-angled side portions 84 and 84'. The entire head rest 36a is mounted so that is can rotate about a generally longitudinal axis. It may also be arranged to translate vertically. For example, as shown in FIG. 8, a bar 86 may link the head rest 36a to the seat back 34a. A side pad 88 is mounted on each of the side portions 84 and 84a of the head rest 36a. Each side pad 88 is tapered in thickness and is centrally mounted so that it can both rotate about its center and move laterally relative to the side portion 84 or 84'. Rotation of the tapered side pad 88 has the effect of changing the angle at which it meets the passenger's head, even though the side portion 84 or 84' is not pivoted, and lateral motion of the side pad 88 changes the effective width of the head rest 36a, as shown in FIGS. 9 and 10.

Figure 12:
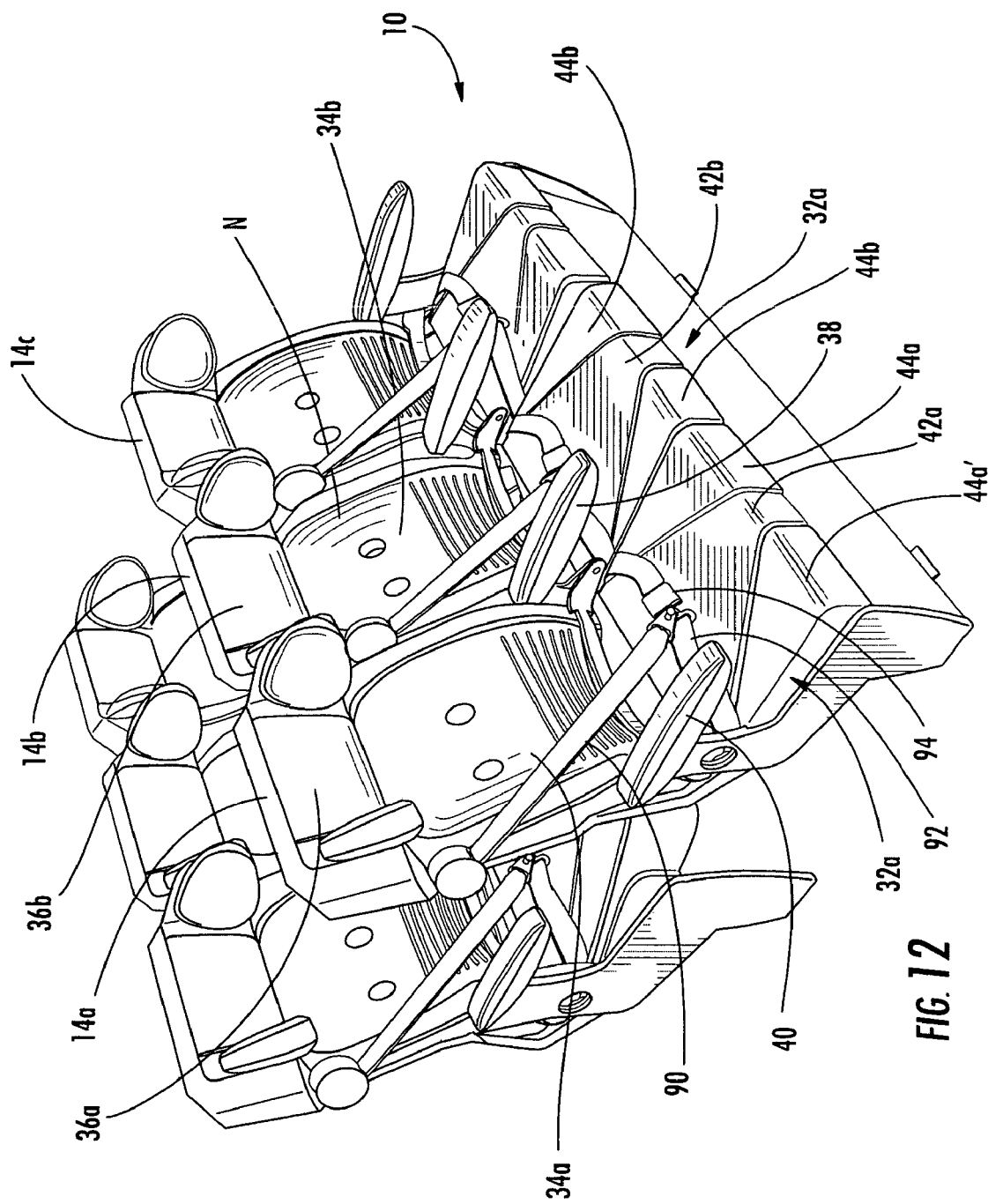
FIG. 12 is a perspective view of a seat incorporating a shoulder harness attached thereto.

FIG. 12 illustrates a seat 12a' which incorporates a shoulder harness 90. The shoulder harness 90 may be connected to a lap belt 92 with a buckle 94 with the shoulder harness 90. The shoulder harness 90 restrains the passenger in his or her own seat 12a during an impact, unlike prior art designs in which the seat forward of the passenger's seat 12a is expected to dissipate the impact of the passenger. Thus, the headpath trajectory of a passenger seated in the seat 12a during an impact is reduced. This allows the front row seat in each zone of an aircraft cabin to be placed closer to the forward bulkhead. This results in increased space in the cabin which can be used to provide addition seat rows or provide addition space (i.e. increased seat pitch) for some or all of the passengers.

The seating arrangement described above has multiple advantages over prior art seating arrangements. By virtue of the fixed backshell 14 with no conventional "aft recline", the last row in each of an aircraft cabin can be placed closer to the rear bulkhead of the zone, increasing the available room in the aircraft cabin.

It should be noted that the fixed living space described herein can be achieved in a number of alternate ways. For example, the backshells 14 may be configured to move, so long at it does not move aft. Alternatively, a backshell may be provided that is fixed for only part of its length, i.e. the upper portion of the backshell 14 may be allowed to recline while the lower part remains fixed.

The foregoing has described a seating arrangement having a features which allow a passenger to assume multiple postures within limited space constraints. These seat features may be combined with each other as desired to produce a seat having multiple comfort features. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A passenger seat for a vehicle, comprising:
   a seat back; and
   a seat bottom, wherein said seat bottom is selectively moveable from a conventional seating configuration to a sleeping configuration in which:
   a forward end thereof is lowered relative to an aft end thereof;
   at least a portion of one side of said seat bottom is higher than at least a portion of the opposite side thereof, relative to a floor of said vehicle, so as to support a passenger who is seated on said seat bottom in a rotated position wherein one of said passenger's hips is higher than the other hip relative to said floor; and
   at least one support wing protrudes upward at said forward end to prevent a passenger seated on said seat bottom from slipping forward, wherein said support wing is generally triangular and two sides of said support wing form portions of a front edge and a side edge of said seat bottom, respectively.

2. The passenger seat of claim 1 wherein said seat back and said seat frame are attached to a frame which is adapted to be mounted to a floor of said vehicle.

3. The passenger seat of claim 1 wherein said support wing is pivotally connected to the remainder of said seat bottom.

4. The passenger seat of claim 3 further including at least one support lever disposed underneath said support wing, said support lever selectively pivotable between a lowered position and a raised position.

5. The passenger seat of claim 1 wherein at least a portion of said seat back may be selectively rotated about a line generally parallel to said passenger's spine so as to create a recessed niche for accommodating one of said passengers shoulders.

6. The passenger seat of claim 1 further including a head rest disposed at an upper end of said seat back, said head rest having two laterally spaced-apart side portions, wherein said head rest is rotatable such that one side portion is lower than the other relative to a floor of said vehicle.

7. The passenger seat of claim 1 wherein said support wing is substantially rigid in said raised position.

8. A passenger seat for a vehicle, comprising:
   a frame for being attached to a floor of said vehicle
   a backshell attached to said frame;
   a seat back inserted into said backshell; and
   a seat bottom attached to said frame, and including at least one support wing disposed at a front corner thereof and delineated from the remainder of said seat bottom by a line oblique to a forward edge of said seat bottom, said support wing being selectively moveable between a lowered position and an effectively raised position, so as to support a passenger who is seated on said seat bottom in a rotated position wherein one of said passenger's hips is higher than the other relative to said floor, and to block said passenger from slipping forward relative to said seat bottom.

9. The passenger seat of claim 8 wherein said backshell is fixed.

10. The passenger seat of claim 8, wherein said support wing is pivotally connected to the remainder of said seat bottom.

11. The passenger seat of claim 10 further including at least one support lever disposed underneath said support wing, said support lever selectively pivotable between a lowered position and a raised position.

12. The passenger seat of claim 8 wherein at least a portion of said seat back may be selectively rotated about a line generally parallel to said passenger's spine so as to create a recessed niche for accommodating one of said passenger's shoulders.

13. The passenger seat of claim 8 further including a head rest disposed at an upper end of said seat back, said having two laterally spaced-apart side portions, wherein said head rest is rotatable such that one side portion is lower than the other relative to a floor of said vehicle.

14. The passenger seat of claim 8 wherein said support wing is generally triangular and two sides of said support wing form portions of a front edge and a side edge of said seat bottom, respectively.

15. The passenger seat of claim 8 wherein said support wing is substantially rigid in said raised position.

* * * * *

UNITED STATES PATENT AND TRADEMARK OFFICE
CERTIFICATE OF CORRECTION

PATENT NO. : 7,055,904 B2 Page 1 of 1
APPLICATION NO. : 10/984581
DATED : June 6, 2006
INVENTOR(S) : Skelly et al.

It is certified that error appears in the above-identified patent and that said Letters Patent is hereby corrected as shown below:

Column 8, line 16, delete "passengers" and enter - - passenger's - -.

Signed and Sealed this

Twenty-second Day of August, 2006

JON W. DUDAS
*Director of the United States Patent and Trademark Office*